(12) United States Patent
Singhal

(10) Patent No.: US 12,052,215 B2
(45) Date of Patent: Jul. 30, 2024

(54) SYSTEMS AND METHODS FOR FASTER DOWNLOAD OF DIGITAL CONTENT IN MOBILE WIRELESS DEVICES

(71) Applicant: Tara Chand Singhal, Torrance, CA (US)

(72) Inventor: Tara Chand Singhal, Torrance, CA (US)

(*) Notice: Subject to any disclaimer, the term of this patent is extended or adjusted under 35 U.S.C. 154(b) by 72 days.

(21) Appl. No.: 14/637,253

(22) Filed: Mar. 3, 2015

(65) Prior Publication Data

US 2015/0213081 A1 Jul. 30, 2015

Related U.S. Application Data

(63) Continuation of application No. 14/565,179, filed on Dec. 9, 2014, now Pat. No. 10,009,255, which is a (Continued)

(51) Int. Cl.
| | |
|---|---|
| H04L 61/45 | (2022.01) |
| G06F 16/23 | (2019.01) |
| G06F 16/951 | (2019.01) |
| H04L 9/40 | (2022.01) |
| H04L 45/12 | (2022.01) |
| H04L 61/4511 | (2022.01) |
| H04L 61/5007 | (2022.01) |

(Continued)

(52) U.S. Cl.
CPC .......... *H04L 61/45* (2022.05); *G06F 16/2379* (2019.01); *G06F 16/951* (2019.01); *H04L 45/126* (2013.01); *H04L 61/4511* (2022.05); *H04L 61/5007* (2022.05); *H04L 63/08* (2013.01); *H04M 15/8005* (2013.01); *H04W 4/023* (2013.01); *H04W 4/029* (2018.02); *H04W 12/06* (2013.01); *H04L 2101/69* (2022.05); *H04W 48/18* (2013.01)

(58) Field of Classification Search
CPC ......... G06F 17/30377; G06F 17/30864; G06F 16/2379; G06F 16/951; H04L 45/126; H04L 61/15; H04L 61/1511; H04L 61/2007; H04L 61/609; H04L 63/08; H04W 4/029; H04W 12/06; H04W 48/18; H04M 15/8005
USPC ....................................................... 707/769
See application file for complete search history.

(56) References Cited

U.S. PATENT DOCUMENTS

| | | | |
|---|---|---|---|
| 2010/0208648 A1* | 8/2010 | Narkar | H04L 67/1002 370/328 |
| 2011/0029398 A1* | 2/2011 | Boudville | H04W 4/029 705/26.1 |

(Continued)

*Primary Examiner* — Hosain T Alam
*Assistant Examiner* — Saba Ahmed
(74) *Attorney, Agent, or Firm* — Aldo Noto, Esq.; RIMON PC

(57) ABSTRACT

A handheld wireless device makes a request for service from a server of a business on a global network, the request originating from the wireless device is automatically routed to the closest server of the business that is geographically closest to the location of the wireless device as determined by a GPS function in the device, or by a router server in the wireless network based on the group of cell towers being connected to by the wireless device, or based on the location of the wireless device in a global telephone network database, for faster access to the service and a response there from.

8 Claims, 12 Drawing Sheets

Related U.S. Application Data continuation of application No. 13/431,730, filed on Mar. 27, 2012, now Pat. No. 8,914,042.

(60) Provisional application No. 61/626,285, filed on Sep. 23, 2011.

(51) Int. Cl.
| | | |
|---|---|---|
| *H04L 101/69* | (2022.01) | |
| *H04M 15/00* | (2024.01) | |
| *H04W 4/02* | (2018.01) | |
| *H04W 4/029* | (2018.01) | |
| *H04W 12/06* | (2021.01) | |
| *H04W 48/18* | (2009.01) | |

(56) References Cited

U.S. PATENT DOCUMENTS

| | | | |
|---|---|---|---|
| 2011/0035497 A1* | 2/2011 | Daly | G06F 9/5027 709/226 |
| 2011/0153938 A1* | 6/2011 | Verzunov | G06F 9/5083 711/118 |
| 2011/0295940 A1* | 12/2011 | Saleem | H04L 61/609 709/203 |
| 2012/0290604 A1* | 11/2012 | Kavitha | G06F 16/2455 707/769 |
| 2012/0331088 A1* | 12/2012 | O'Hare | G06F 21/6227 709/214 |
| 2013/0262107 A1* | 10/2013 | Bernard | G06F 16/40 704/235 |
| 2014/0074780 A1* | 3/2014 | Goetsch | G06F 16/273 707/613 |

* cited by examiner

① Network Server 20
Maintain IP address database 19> <receive updates from businesses>

② Receive request from Device-WB to download table update
Verify Device/Browser identity ③ < compress and digital sign table >
< download to wireless devices>

④ Handheld wireless device 12
Each device WB has means to check latest version from Network Server and download.
Receive table, uncompress/check signature, update local table ⑤ Wireless Device user operation 12A
Application/User request for a web link ⑥ Wireless Browser 16
check link in the table 18?

⑦ Find GPS location

⑧ find nearest IP address in table
Return IP address for link

⑨ Browser makes connection to IP address

End

FIGURE 1B

Wireless Network Router Server 17

1. Maintain IP address database <receive updates from businesses>
2. Receive server request from Device-WB
3. Filter on request is for service from a server with IP address in Table,
4. If yes, Determine nearest server IP address
5. Route service request to nearest IP address End

Business Central Service Server 40

1. Receive server request from Device-WB
2. Filter on Sending IP address
3. Determine if request is from a wireless mobile device,
4. If yes, send a query with the caller id to the global telephone network database 42
5. Receive location of the wireless device
6. Find the nearest service server
7. Route service request to that nearest IP address End

Central Server 40

Logic 54 a function 70 that receives by the business server a request for service on a global network, a function 72 that filters the request and determines those requests that are from a wireless mobile device associated with a caller id from a cellular telephone network, a function 74 that parses the caller id and the network identification from the request for service's return address, a function 76 that sends a query with the device caller id to a global telephone network database to retrieve the cell location of the device and receiving the location of the device.

a function 78 that uses the cell identification and finds the nearest service server and its IP address, a function 80 that forwards the service request to that IP address.

FIGURE 3D

At step 100, computing a geographic location of the device using a global positioning system (GPS) function in the device;

At step 102, storing in a storage memory of the device and operating there from, a browser application for interfacing the device with servers on a global computer network and determining dynamically by a browser function, an IP address of an outgoing service request, at the time of the request, to a geographically closest global network server that is closest to the geographic location of the device to provide faster access to the service;

At step 104, maintaining by the browser function a table that maps business domain names to at least two IP addresses of the geographically dispersed servers in different parts of the country;

At step 106, using by the browser function the table and the GPS location of the device to dynamically determining which of the geographically dispersed servers is the nearest server;

At step 108, requesting the outgoing service to a server from a group that includes a web sever, a mail server, a text message server, and an ftp server;

At step 110, updating periodically by the browser function the contents of the table from a network server;

At step 112, updating their IP address by the service servers of businesses in the table in the network server;

At step 114, charging a fee to the businesses.

FIGURE 5A

At step 120, pre-storing by the routing server a database that maps IP addresses of service servers of businesses to other IP addresses of the servers that are positioned closest to a group of cell towers in the wireless network;

At step 122, filtering by a filter function on a request for service that has originated from a mobile handheld wireless device in the wireless network for access to a service from a server with an IP address that is in the pre-database of servers;

At step 124, directing by a direct function the service request to the closest service server from the database based on the cell tower location of the wireless mobile device, for faster access and response from the service server for the service to the wireless mobile device;

At step 126, charging by the carrier a fee to the businesses for providing faster access to their closest servers for the service requests originating from the wireless devices.

FIGURE 5B

At step 128, receiving by the business server a request for service on a global network;

At step 130, filtering the request and determining those requests that are from a wireless mobile device associated with a caller id from a cellular telephone network;

At step 132, parsing the caller id and the network identification from the request for service's return address;

At step 134, sending a query with the device caller id to a global telephone network database to retrieve the cell location of the device and receiving the location of the device.

At step 136, using the cell identification, finding the nearest service server and its IP address.

At step 138, forwarding the service request to the IP address.

FIGURE 5C

SYSTEMS AND METHODS FOR FASTER DOWNLOAD OF DIGITAL CONTENT IN MOBILE WIRELESS DEVICES

CROSS REFERENCE

This application is a continuation of and claims priority from U.S. application Ser. No. 14/565,179, filed Dec. 9, 2014, titled "Systems and Methods For Faster Access And Downloads Of Digital Content In Mobile Wireless Devices" of Tara Chand Singhal. The application Ser. No. 14/565,179 is incorporated herein by reference.

The above referenced application is a continuation of and claims priority from U.S. application Ser. No. 13/431,730, filed Mar. 27, 2012, titled "Systems For Faster Access And Downloads Of Digital Content In Mobile Wireless Devices Using Cellular Network" of Tara Chand Singhal. The application Ser. No. 13/431,730 is incorporated herein by reference.

This above referenced application claims priority from provisional application Ser. No. 61/626,285, filed Sep. 23, 2011, titled "Systems For Faster Access And Downloads Of Digital Content In Mobile Wireless Devices" of Tara Chand Singhal. The application Ser. No. 61/626,285 is incorporated herein by reference.

FIELD OF THE INVENTION

Embodiments described herein provide for apparatus and methods that enable faster access and download of digital content from service servers in the global computer network to the wireless mobile devices on the global network as well as enable efficient utilization of the global network by eliminating unnecessary traffic.

BACKGROUND

Some years ago, US businesses to speed up the access to their digital content, over the global computer network, from their centrally located web servers to their customers' personal computers, spread over the United States, used a technology that was pioneered by Akamai®. This technology provided geographically dispersed web-servers in different regions of the country that mirror imaged the central web server.

In this technology, when a customer would connect to the central web-servers, logic therein would map the customer request IP address to a geographic region based on the location of the IP address router and transfer the customer request to the nearest geographically located web server. This nearest server would then download the web pages, thus allowing for a faster download and a better customer experience in reducing the download time.

The Akamai technology may also be used in other applications such as download of large amounts of digital data such as when an application is purchased or updated. Those businesses that made a business judgment that a good customer experience in faster download is desirable choose to use the Akamai technology.

The world has seen a great upsurge in use of handheld mobile wireless devices. Modern handheld wireless devices have the ability to connect to the global Internet like any personal computer via their wireless carrier as an Internet Service Provider (ISP) and receive and download digital content from any web-server globally.

Therefore, it is an objective of the embodiments herein to have technologies that speed up loading of digital content on the handheld mobile wireless devices. It is yet another objective to make more efficient use of the global network by minimizing unnecessary network traffic.

SUMMARY

A browser in a personal computer is used to interface the personal computer to the global computer network by creating a Hyper Text Transport Protocol (HTTP) request for web service from a web server on the global network.

Web servers are primarily identified by an Internet Protocol (IP) address and are secondarily identified by a domain name. Domain names are easier to use for people to create, remember and use. There are special types of web servers on the global network that are identified as Domain name servers. These domain name servers provide a mapping from the domain names of the web servers to the IP addresses of these web servers. Hence when a web browser makes a requested connection to a web server, the web browser first makes that request to the domain name servers which when given the domain name returns its unique IP address to the web browser in the personal computer. The web browser then makes a web server request to a web server using that IP address.

The IP addresses exist in pairs as primary and secondary. Where, if the primary web-server is in maintenance mode the web service request is automatically switched to and served by the secondary web-server.

Hence, global computer network traffic is created when the web-server that may be located any where globally receives a service request from a personal computer. The global network is structured in the form of a hierarchical network of routers that receive and route packets based on their destination IP addresses.

The routers have the logic to assess the health of the network at any given time and then find an optimum route to route the packet to the next router. The next router repeats the same router functions and so on until the packet is delivered to the router that is nearest to the final destination router. The final destination router delivers the packet to the specific web server. There may be as many as more or less dozen or so router hops before a packet is delivered to the final destination router depending upon how far the destination web-server is on the global network from the web-browser in the personal computer.

The above described web browser, web server, and global computer network functionality does not change when the browser is used in a mobile wireless device, except the last leg or part's of the packet's journey is provided by a wireless network of the cellular network carrier to which the mobile wireless device is connected to or subscribed to.

The embodiments described herein provide technology features and functions for faster access to digital content and faster download of such digital content in to the mobile wireless devices. These embodiments may be implemented alternatively depending upon the business decision of market players who would implement these embodiments.

The three different embodiments that are described are (i) using a web-browser in a mobile wireless device, (ii) using features of a wireless network, or (iii) using a business's service server that is optimized for handheld wireless mobile devices. These embodiments provide for a faster access and download time to the mobile device for digital content as well as to reduce and minimize overall global computer network usage.

In the first of these alternative embodiments, a handheld wireless device has a wireless browser application, stored in a storage memory of the device and operable there from that interfaces the device with web servers on a global computer network. The wireless browser has a browser function that dynamically determines an IP address, using an IP address table in the browser function itself, of an outgoing service request, at the time of the request, to a geographically closest global network server that is closest to the geographic location of the mobile wireless device to provide faster access to the service.

The browser function maintains a table that maps business domain names to at least two IP addresses of the geographically dispersed servers in different parts of the country and the browser function uses the table and the GPS location of the device to dynamically determine which of the geographically dispersed servers provides the closest web server.

In the second of these alternative embodiments, the IP address table is not maintained in the wireless browser but is maintained in the router of the wireless carrier network and is used to dynamically determine the IP address of the closest service sever based on the Wireless network's knowledge of the cell tower from where from the wireless device is connected to from.

In the third of these alternative embodiments, the wireless device location is determined by the business's central service server from a global telephone network database and based on that location the request link is handed over or forwarded to the nearest service server.

All these embodiments are dependent upon having mirror image servers located in different parts of a country or world, located preferably, near large population centers. Mirror imaging itself is prior art technology in wide spread use for many applications including data backups for 24/7 uptime severs that may be used in many critical applications.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIGS. 1A, 1B, 1C are block diagrams that illustrates features of the one of the embodiments of the invention, using a wireless browser, for faster access and download of digital content to a mobile wireless device;

FIGS. 3A, 3B, 3C, and 3D are block diagrams that illustrates features of the one of the embodiments of the invention, using a global telephone network database, for faster download of digital content to a mobile wireless device;

FIGS. 5A, 5B, and 5C are method diagrams for the embodiments herein.

DESCRIPTION

Introduction

Figure 1A:
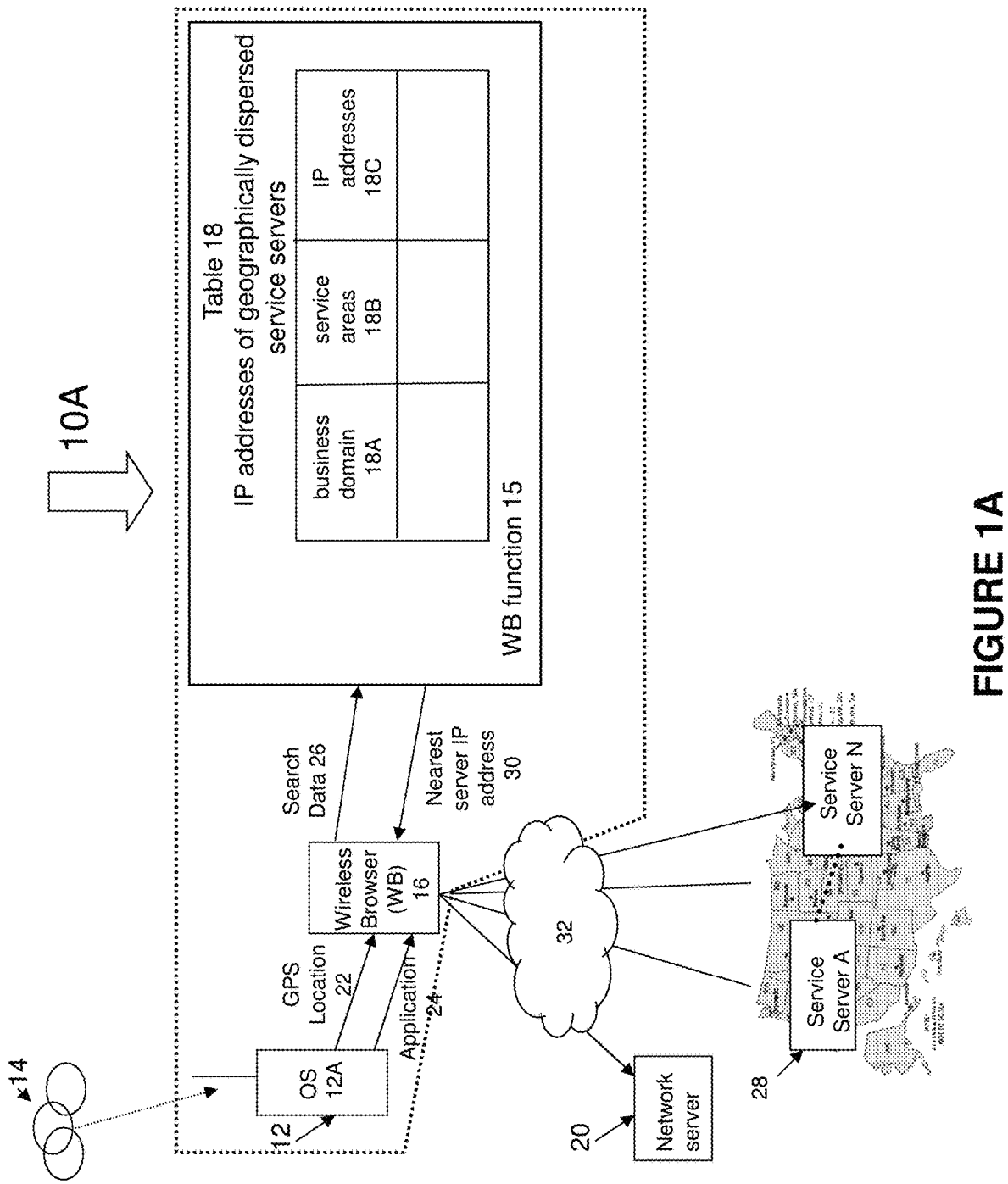

Wireless mobile devices are being used for many more and different types of applications then in the past. These, it is believed, require faster connections to the service servers on the global computer network. These service servers may fall in different categories. One category may include servers where the data being exchanged is short and bi-directional. That would be the case for exchange of messages for banking, payment and security applications. The other category of applications may include service servers that download large amounts of data to the mobile devices such as in music and video, where streaming technology may be used. In streaming technology, the data is delivered in blocks as it is used or consumed. Yet more categories of applications may exist now or in the future.

While the service requirements may differ in different types of applications, all would have the requirement for faster access and faster download time. Users of these devices do not generally like to wait for responses from the network, while holding the device in their hand.

It is believed that the customers of handheld mobile wireless devices are more sensitive to waiting time for access and download than are the customers using personal computers connected to broad band landlines. Hence, it is believed, improvements in access and loading time by combination of improvements in both the wireless networks as well as positioning the content servers closest to their customer are highly desirable.

Hence, the embodiments described herein are directed to achieve faster access and downloads by determining the physical location of the wireless mobile device and dynamically determining for each service request from the wireless device, where the nearest service server would be for that request and directing the service request to that specific server.

These embodiments depend upon businesses having mirror image service servers located in different parts of the country. It is anticipated that businesses may commission additional servers that would be positioned in different parts of the country or world to exclusively service the wireless mobile devices to speed up the access to and delivery of digital content to mobile wireless devices to provide better quality of service. Such service servers may be positioned closer to urban areas near large population centers.

When a mobile wireless device connects to service servers over the global computer network, two different types of networks are likely to be used. One of these is the wireless network of the wireless network carrier and the other is the global computer network of servers connected by a global network of routers. In such a hybrid network of global connectivity, the wireless carriers act in the role of Internet service provider by connecting the mobile device connection requests that originate in their wireless network to the global network.

There are different capacity and latency issues involved with each type of the network wireless or the landline. The wireless network carriers are working to improve their wireless networks by bringing faster network technologies such as LTE 4G and other such network technologies. However, the wireless network carriers have no control over the global network as it is provided and managed by many independent entities.

Three different embodiments 10A, 10B and 10C are illustrated with reference to three set of FIGS. 1A-B-C, 2A-B-C and 3A-B-C-D respectively. These embodiments differ in where the faster access and download technology is placed, in the wireless device itself, or the wireless network, or the service server itself.

Figure 1C:
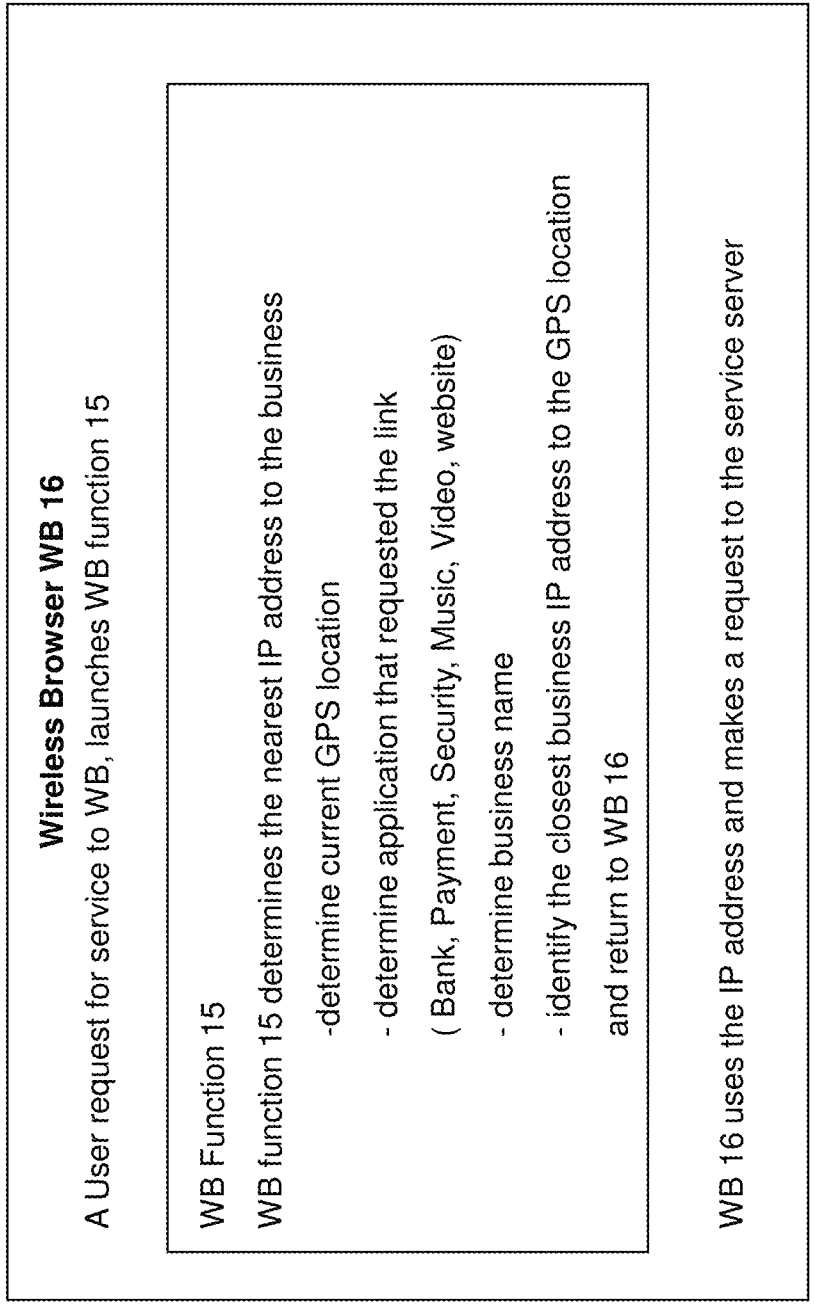

Embodiment 10A as illustrated with the help of FIGS. 1A, 1B and 1C uses unique features and functions in a wireless browser 16 of the wireless device 12. Embodiment 10B as in FIGS. 2A, 2B, and 2C uses features and functions in a wireless network of the wireless network carriers, where the mirror image servers may be co-located near the vicinity of such wireless networks.

These improvements resulting in faster access and downloads to wireless mobile devices would be in addition to the improvements in the wireless networks themselves that is being implemented by wireless carriers such as 4G also known as LTE. The businesses may position their service servers integrated with the wireless networks themselves to further improve access and loading time as in embodiment 10B as illustrated with the help of FIGS. 2A, 2B and 2C.

Embodiment 10C as illustrated with the help of FIGS. 3A, 3B 3C and 3D uses features and functions in the central servers of the businesses and its interface with the global telephone network database to determine the wireless device location at the time of the service request.

These embodiments help wireless mobile devices achieve faster access to and download to some, or critical, or all applications depending upon which businesses and services elect to choose to use the faster access and download service.

Embodiment 10A may be made available by a business independently of any other business as it is implemented in the Wireless Browser of the wireless device, where adaptations of the prior art wireless browser may be sold as applications. Embodiment 10B requires implementation by the wireless carriers themselves and does not require any feature in the device or the wireless browser. Embodiment 10C also does not require any feature in the device or the browser and may be made available by each of the service businesses independent of each other. Hence, embodiments 10B and 10C are independent of the mobile device.

Each of these embodiments has their own advantages. In each of the embodiments, it is assumed that the costs of the service would be borne by the service businesses.

The faster access and download service itself as described herein may be implemented by the cellular carriers, as these carriers control not only their wireless network but also the wireless device which their subscriber's carry and use. The carriers then may recover cost and or revenue from the service businesses for the service of providing faster access and download to their mobile customers using wireless mobile devices.

These and other aspects of the embodiments are described here where the headings are provided for the reader's convenience.

Embodiment 10A

With reference to FIG. 1A, in an embodiment 10A, a portable wireless computing and communication device 12 has an operating system 12A and a Wireless Browser (WB) 16. The device 12 also has a GPS function (not shown) that provides a location 22 of the device 12 with the help of GPS satellites 14. The WB 16 has a browser function 15 that maintains a table 18. The table 18 maintains IP addresses of geographically dispersed servers of businesses. The WB function 15 has a function to periodically connect to a network server 20 to update the contents of the table 18.

When a user of the device 12 has an application 24 that requires a web server interface, that request is passed on to the WB 16. The WB 16 then determines the GPS location of the device 12 and passes these search data 26, including the request and the device's GPS location to the WB function 15.

The WB function 15 using the table 18 determines the nearest service server to the device location and returns their IP address data 30 to WB 16. The WB 16 then using this specific IP address creates a service request. That service request is to the nearest service server 28, a server A to N based on its geographic proximity to the device 12 location.

Thus for each web server request in the device 12, WB function 15 makes a dynamic determination of the IP address of the nearest server before the WB 16 makes a request for service using the HTTP. Thus providing, each time a server request is made in the device 12, for a faster access and a faster download time, as the digital content to the device 12 is retrieved from the nearest service server to the device 12.

The contents of table 18 that is maintained as part of the WB function 15 may be subject to change over time. The contents of table 18 may change because more businesses may want to become part of this service or even the predefined IP addresses of the businesses that are already part of the service may change. Further the format and content of table 18 may be improved over time. Hence, the table 18 including the WB function 15 may need to be updated on a regular basis in each of the devices 12 that are part of this service. A network server 20 as illustrated in FIG. 4 is provided to facilitate such updates.

Figure 4:
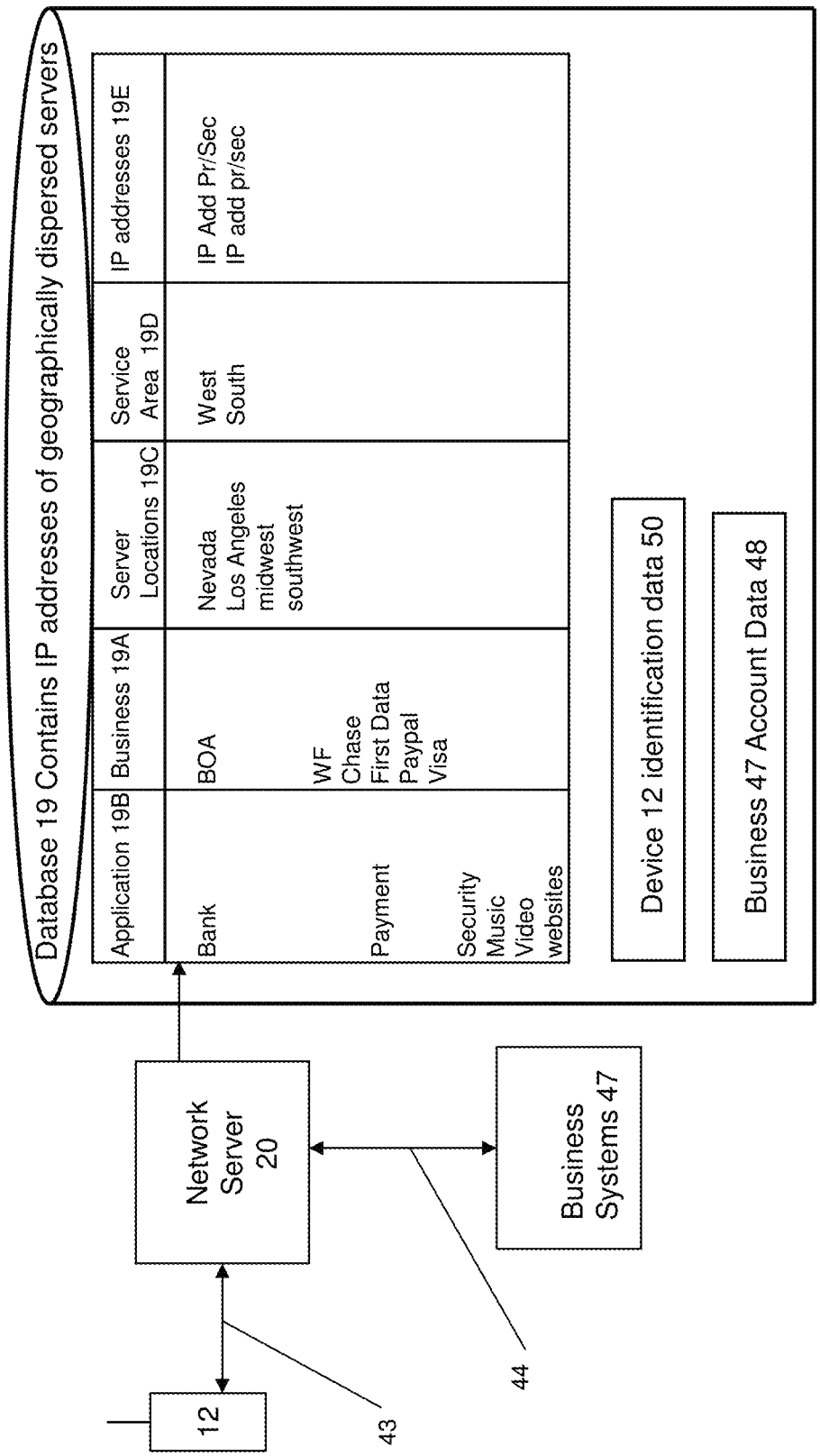
FIG. 4 is a block diagram of a network server and its database for maintaining and updating IP addresses of businesses that would subscribe to the faster access and download service.

FIG. 4 illustrates features of the network server 20. Server 20 is based on prior art server technology adapted to provide the functions of the embodiments herein. Server 20 may be maintained by a business that distributes the adapted wireless browser 16 adapted with the browser function 15 to the wireless devices 12.

As illustrated with reference to FIG. 4, Server 20 maintains a database server with database 19 that maintains data related to the business and their servers. Specifically the database 19 may maintain data related to Businesses 19A, their different applications 19B for use with mobile devices, their servers 19C for serving the wireless device, their respective service areas 19D and their IP addresses 19E. There may be more or different types of data that may be maintained in the database 19 and that is not ruled out.

Additional data bases may also be maintained in the network server 20. These may include device 12 identification data 50 and business 47 account data 48 and their related security data.

The server 20 has two different interfaces. There may be more interfaces and these are not ruled out. Via one of these interfaces 43, server 20 maintains account data related to the wireless devices 12 to be able to identify them when these devices make a request for table 18 update and to digitally sign the update data including the table data. Alternatively the server 20 may make a decision to upload the WB function 15 and its database 18 to the device 12. Such type of update interfaces are common in prior art. One example is anti-virus software updates.

For the second of these interfaces 44, server 20 maintains an interface with the business systems 47 for the businesses that are identified in database 19, as business 19A.

This interface 44 may be used for an accounting system for the businesses 47 who desire to use the services for faster access download to their mobile device customers. Using this account system interface, they are able to enter and update data fields related to the location and IP addresses of their service servers as well as update other data such as when they make available new applications for their mobile device customers.

The table 18 that is maintained in the WB function 15 is a version of the database 19 in the server 20 and may have additional fields to categorize and identify the various businesses. The businesses may be categorized by the types of applications they may offer to their wireless device customers. These categories may include banking/payment transactions, security applications, delivery of music, delivery of video content, delivery of coupons in a coupon service server. The delivery may take any number of formats and may include SMS, e-mail, streaming, FTP, etc. Other types and categories of businesses and modes of delivery are not ruled out.

A handheld wireless device 12 has a global positioning system (GPS) function in the device that provides a geographic location of the device. A browser application 16 stored in a storage memory of the device and operable there from, that interfaces the device with servers on a global computer network.

The browser application 16 has a browser function 15 that dynamically determines an IP address of an outgoing service request, at the time of the request, to a geographically closest global network server that is closest to the geographic location of the device to provide faster access to the service.

The browser function 15 maintains a table 18 that maps business domain names to at least two IP addresses of the geographically dispersed servers in different parts of the country. The browser function 15 uses the table 18 and the GPS location of the device 12 to dynamically determine which of the geographically dispersed servers provides the closest server 28.

The outgoing service request is to a server from a group that includes a web sever, a mail server, a text message server, and an ftp server.

The browser function 15 updates periodically, preferably in non-peak time, the contents of the table 18 from a network server 20. The servers of businesses update their IP address in the table 19 in the network server 20. The businesses may be charged a fee for the service.

The network server 20 maintains a database of IP addresses 19 of businesses and the network server has a business interface 44 for creation of an account and receiving updates of the IP addresses. The network server 20 levies a fee to the business 47 on account opening related to number of servers and number of accesses.

The network server 20 has an interface 43 to receive a request and down load an updated table 18 to a wireless device 12. The table 18 has columns that maps applications to businesses, their domain names, their multiple servers with IP addresses.

Operational Mode

The operational mode of embodiment 10A is illustrated with reference to FIG. 1B. Steps 1 to 3 are performed by a network server 20. This network server 20 maintains the IP address database 19.

At step 1, a network server is maintained by a business entity. The network server maintains an IP address database and receives updates to that database from businesses that provide for multiple geographically distributed mirror imaged service servers.

At step 2, the network server 20 receives request from a device 12 to update/download their IP address database 18.

At step 3, the server 20 verifies the identity of the device 12 and digitally signs the table and downloads to the device 12.

Step 4 is performed by the device 12 and the wireless browser 16 for receiving updates. At step 4, each device WB 16 has the WB function 15. WB function 15 checks for the latest versions of table 18 from network server 20 and makes a request for download of the table, receive the table, uncompress/check security signature, and then update the local database 18 in each of the devices 12.

Steps 5 to 9 are used during operation of the device 12.

At step 5, Application/User makes a request for a web link for the application.

At step 6, WB function 15 checks if the requested domain link of the application is in the table 18?

At step 7, if yes, WB function 15 requests current GPS location from the GPS function.

At step 8, WB function 15 uses that GPS location to find nearest IP address in the service area of the service server in the IP address database 18.

At step 9, WB 16 makes connection to IP address.

The functions of the WB 16 and the WB function 15 are illustrated with reference to FIG. 1C. When a user of device 12 requests a service from a web server, the WB 16 launches the WB function 15. The WB function 15 determines the nearest IP address with the help of table 18. The functions of WB 15 are, (i) determine current GPS location, (ii) determine application that requested the link, (iii) determine business name, (iv) determine service area based on GPS location and (v) determine the nearest IP address in that service area for the business and the business's application. Return that IP address to the WB 16.

With reference to FIG. 5A, a method for handheld wireless device access to global servers has the steps where all the steps may not be used or used in the order specified:

At step 100, computing a geographic location of the device using a global positioning system (GPS) function in the device.

At step 102, storing in a storage memory of the device and operating there from, a browser application for interfacing the device with servers on a global computer network and determining dynamically by a browser function, an IP address of an outgoing service request, at the time of the request, to a geographically closest global network server that is closest to the geographic location of the device to provide faster access to the service.

At step 104, maintaining by the browser function a table that maps business domain names to at least two IP addresses of the geographically dispersed servers in different parts of the country.

At step 106, using by the browser function the table and the GPS location of the device to dynamically determining which of the geographically dispersed servers is the nearest server.

At step 108, requesting the outgoing service to a server from a group that includes a web sever, a mail server, a text message server, and an ftp server.

At step 110, updating periodically by the browser function the contents of the table from a network server.

At step 112, updating their IP address by the service servers of businesses in the table in the network server.

At step 114, charging a fee to the businesses.

As a simplified illustration, of the utility of the embodiment 10A, if a wireless device 12 user makes a service connection to www.bankofamerica.com, the browser function 15 of WB16 would detect the HTTP construct href and look for this domain name in the table 18, and if found, and using the GPS location, would get the IP address of the nearest service server of Bank of America and substitute that IP address in the href.

It is believed, that this would avoid the traffic to a domain name server to determine the IP address of the main Bank of America service server and also the traffic between the main servers that may be in North Carolina with the wireless device 12. Instead the wireless device 12 would communicate with the Bank of America server in Los Angeles directly, if that is where the device 12 is and where the Bank of America local service server is hosted, thus assuring a faster access and download to the device 12.

For those HTTP href requests in the device 12 that have connection requests to servers that are not part of the table 18, the prior art process to satisfy the connection request would be carried out by the wireless browser.

Embodiment 10B

Figure 2A:
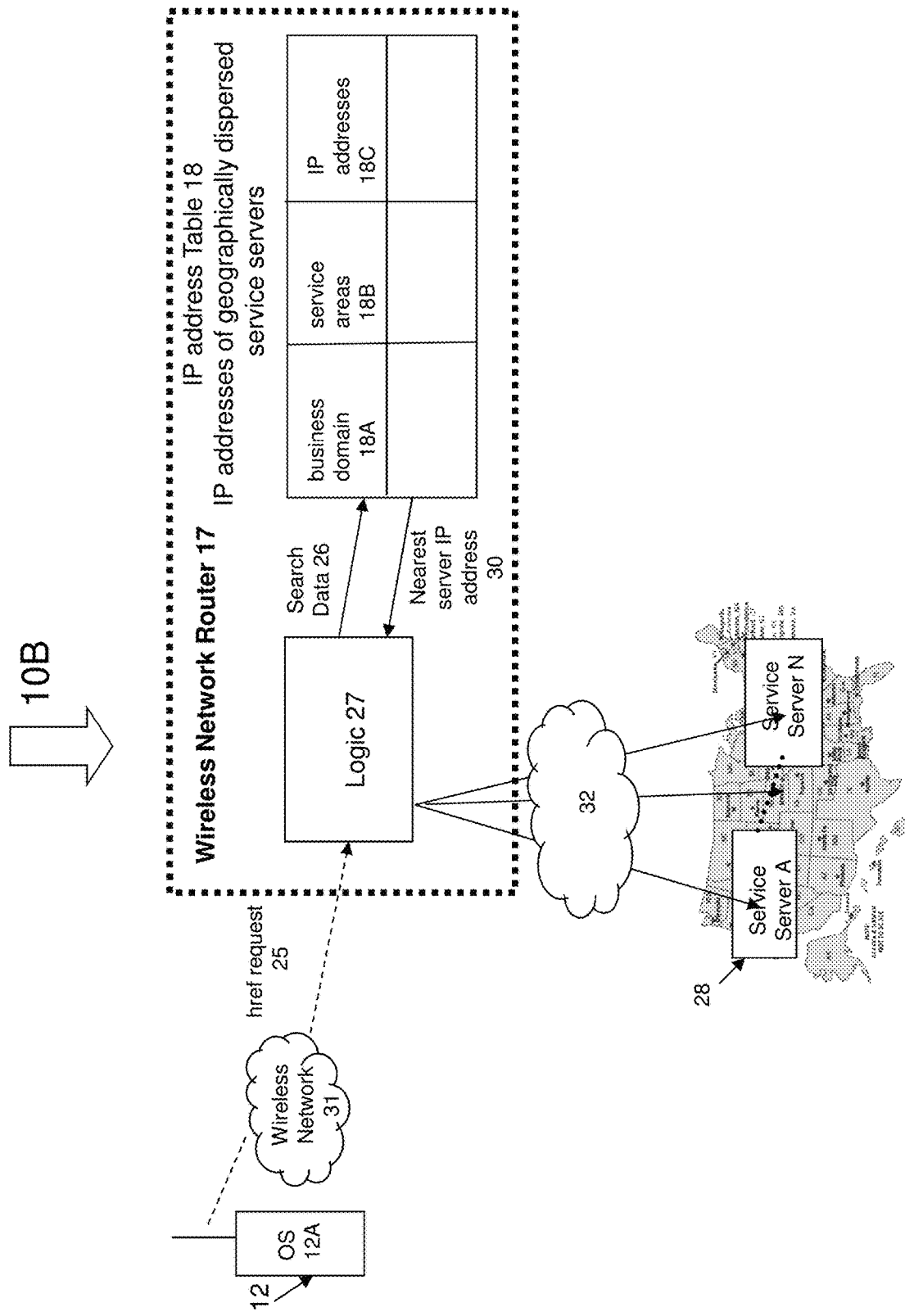
FIGS. 2A, 2B, 2C are block diagrams that illustrates features of the one of the embodiments of the invention, using a wireless network, for faster access and download of digital content to a mobile wireless device.

In an alternative embodiment 10B as illustrated with reference to FIGS. 2A, 2B, and 2C, the need for the browser function 15 in WB 16 as described in embodiment 10A is dispensed with and a service server request from wireless device 12 is received by the wireless network 31.

As illustrated with reference to FIG. 2A, the wireless network 31 has a wireless carrier network router 17 with logic 27 that is described later with the help of FIG. 2C. The wireless network 31 has the router 17 that connects between the wireless network 31 and the global computer network 32, known as Internet. Logic 27 is provided in this router 17. This wireless network router logic 27 maintains the table 18 and uses the logic 27 and the table 18 to route the request to the nearest service server of a business. The functions of the logic 27 are illustrated with reference to FIG. 2C.

Wireless Carrier Network Router 17

Figures 2B, 2C:
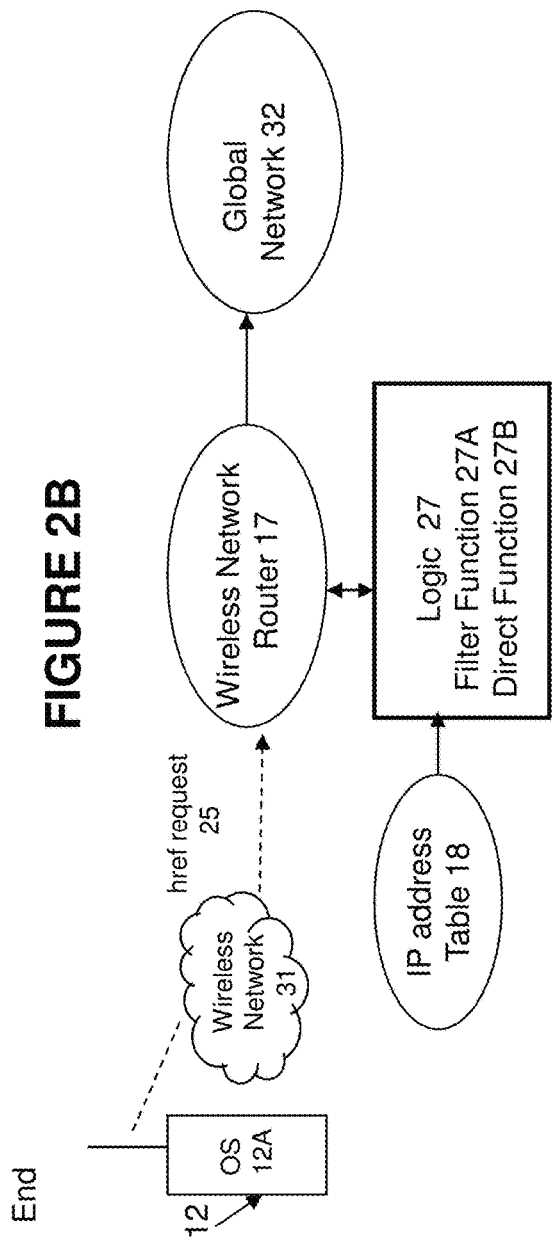

With reference to FIG. 2C, the functions and logic of the network router 17 are illustrated. The router 17 receives traffic from devices 12 via wireless network 31 and using the logic 27 filters on HTTP construct herf. The logic 27 from the filtered href, finds those domain names or IP addresses that belong to the business in table 18. Then the router 17 using the device 12 location from the wireless network 31 finds the nearest service server and its IP address and substitutes the domain name or the IP address in the original request with the IP address from the table 18 to be able to direct the request directly to the nearest server in the global network 32, without the request being directed to the main/central service server.

The routing server 17 within a wireless network 31 of a wireless carrier has a pre-stored table 18 that maps IP addresses of service servers of businesses to other IP addresses of the servers that are positioned closest to a group of cell towers in the wireless network. The routing server logic 27 may update the table 18 from the network server 20 and its database 19 as has been illustrated with reference to FIG. 4 as used in the embodiment 10A.

A filter function 27A filters on a request for service that has originated from a mobile handheld wireless device in the wireless network is for access to a service from a server with an IP address that is in the pre-stored database of servers. A direct function 27B that directs the service request to the closest service server from the table based on the cell tower location of the wireless mobile device, for faster access and response from the service server for the service to the wireless mobile device.

The incoming service request from device 12 may be to a server from a group that includes a web sever, a mail server, a text message server, an ftp server, an audio server, and a video server.

The carrier may charge a nominal fee to the businesses for providing faster access to their closest servers for the service requests originating from the wireless devices. In the alternative, the wireless carriers may provide that service free to both the device users and the businesses to improve the operation and speed of their networks as a competitive advantage among different wireless carriers.

Operational Mode

The operational mode is illustrated with reference to FIG. 2B. Logic 27 is provided in the network router 17 to route the request to the nearest service server.

In this logic, at step 1, the wireless network router 17 maintains an IP address table 18 and receives updates to this table 18 from the network server 20 and database 19, which in turn receives updates from the service servers if there are updates and changes.

At step 2, the wireless network router receives service requests from the device 12 WB 16.

At step 3, the logic 27A filters on these requests from the wireless device to find those whose IP address or domain name is in the IP address table 18.

At step 4, if the requested domain name is in the IP address table 18, then the IP address of the nearest server is found.

At step 5, the logic 27B redirects the service request to the nearest service server 28.

As illustrated with reference to FIG. 5B, a method for a routing server within a wireless network of a wireless carrier has the steps where all the steps may not be used or used in the order specified:

At step 120, pre-storing by the routing server a database that maps IP addresses of service servers of businesses to other IP addresses of the servers that are positioned closest to a group of cell towers in the wireless network;

At step 122, filtering by a filter function on a request for service that has originated from a mobile handheld wireless device in the wireless network for access to a service from a server with an IP address that is in the pre-database of servers;

At step 124, directing by a direct function the service request to the closest service server from the database based on the cell tower location of the wireless mobile device, for faster access and response from the service server for the service to the wireless mobile device;

At step 126, charging by the carrier a fee to the businesses for providing faster access to their closest servers for the service requests originating from the wireless devices.

As a simplified illustration, of the utility of embodiment 10B, if a user makes a service connection to www.bankofamerica.com, the browser WB16 would send the request to the Wireless network to be received by the wireless network router 17 before being routed into the global network 32 to a central/main Bank of America server. The router would filter on the href, find the domain name either as a name or an IP address, look up in the table 18 using the cell tower location of the device to identify the nearest Bank of America server and change the href to that specific IP address.

It is believed, that this would avoid the traffic to a domain name server to determine the IP address of the main Bank of America service server and also the traffic between the main servers that may be North Carolina with the wireless device 12. Instead the wireless device 12 would communicate with the Bank of America server in Los angles, if that is where the device 12 is and where the Bank of America local service server is hosted, thus assuring a faster access and download to the device 12.

For those HTTP href requests in the device 12 that have connection requests to servers that are not part of the table 18, the prior art process to satisfy the connection request would be carried out by the router 17.

Embodiment 10C

In yet another alternative embodiment 10C, as illustrated with reference to FIGS. 3A, 3B, 3C and 3D, the need for adaptations to WB 16 as used in embodiment 10A is also dispensed with.

Figure 3A:
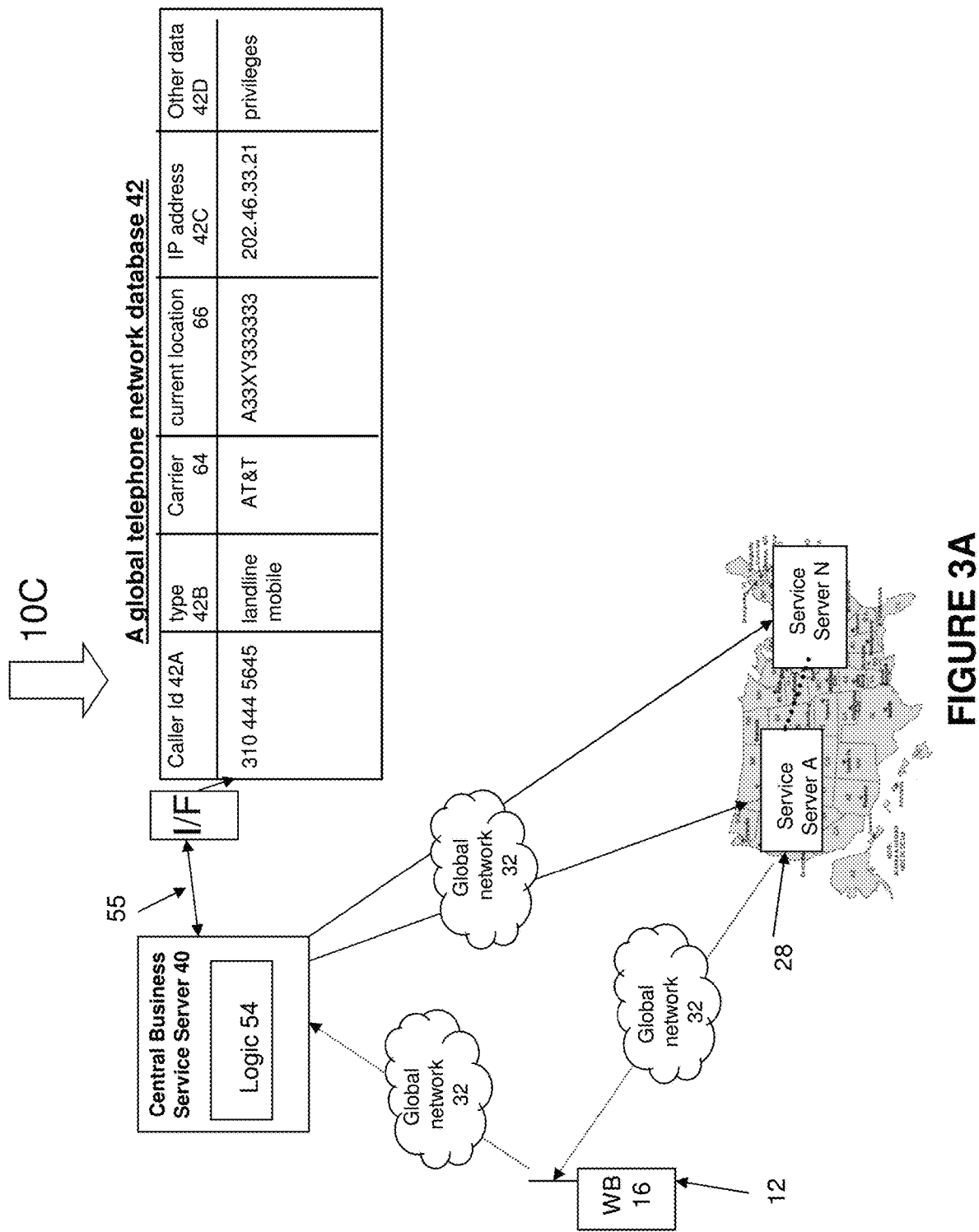

In embodiment 10C, as illustrated with reference to FIG. 3A, a server request from device 12 via wireless browser 16 in the device 12 is received by a central server 40 of the business over the global network 32. The server 40 may by positioned in any part of the global network. The central server 40 being on the global network receives service request from any source on the global network using HTTP. As that would be the case in prior art using prior art mobile wireless device having a prior art browser.

The server 40 has a logic 54 that determines if the service request is specifically from a wireless mobile wireless device 12, the logic 54 ascertains that by parsing and analyzing the service requestor's return address. The return address, if it is from a mobile wireless device, would have reference to the device's caller id as well as the IP address of the router of the wireless network. As a simplified illustration the return address of the device 12 may have the format 3103345678@sprint network.com, where 310 334 5678 is the caller id of the mobile wireless device 12. All mobile wireless devices have a caller id associated with them as assigned by the cellular network carrier company. Hence the device 12 return-address not only identifies the caller id of the device 12, it also identifies the specific wireless network that the device is subscribed to or is a part of.

If the logic 54 determines that the service request is from a mobile wireless device 12, the logic 54 creates a request using a central server 40 interface 55 with a prior art telephone network database 42. The request contains the caller id and may also contain the cellular carrier identification.

The logic 54, in return, over the interface 55, receives from the database 42, the current physical location of the mobile wireless device 12 identified by a geographic cell number where the device is currently located.

Such a prior art database 42 is globally used by the telephone carriers both landline and wireless to identify the type and the location of the called telephone device to route the call to the destination telephone equipment. In the database 42, a mobile wireless device 12 has its current device location described by its geographic cell number.

The database 42, it is believed has the data fields that correspond to caller id 42A, type 42B, carrier 64, current cell id 66, IP address 42C, and other data 42D.

The logic 54 in the central server 40 after having received the geographic location by identification to a cell area from the database 42 uses this device location to map to the nearest service server of the business. Once the logic 54 finds the nearest service server, the logic hands over the request to that nearest server. That is, the server 40 with the help of logic 54 routs the service request from the device 12 to a service server A to N over the global network 32. The specific service server from A to N that is closest to the device 12 then responds to the request from the device 12 over the global network 32.

With reference to FIG. 3D, the logic 54 functions are illustrated. The logic functions 54 perform the tasks of receives request from device 12, filters on sending IP address, determines if the request is from a mobile wireless device, if yes, sends a query with the device caller id to a global telephone network database 42 to retrieve the location of the device 12, receives the location of the device 12, finds the nearest service server and the server 40 logic 54 forwards or directs the request to that IP address.

As illustrated with reference to FIG. 3D, the embodiment 10C has a logic 54 that has a function 70 that receives by the business server a request for service on a global network, a function 72 that filters the request and determines those requests that are from a wireless mobile device associated with a caller id from a cellular telephone network, a function 74 that parses the caller id and the network identification from the request for service's return address, and a 76 function that sends a query with the device caller id to a global telephone network database to retrieve the cell location of the device and receiving the location of the device.

As illustrated with reference to FIG. 3D, the embodiment 10C has a logic 54 that has a function 78 that uses the cell identification and finds the nearest service server and its IP address, and a function 80 that forwards the service request to that IP address.

Thus the device 12 receives service from the server that is closest to the device 12. These features of the embodiment 10C, it is believed, of the central server 40 and logic 54 therein provide for a faster download of the digital content to the device 12.

Operational Mode

Figures 3B, 3C:
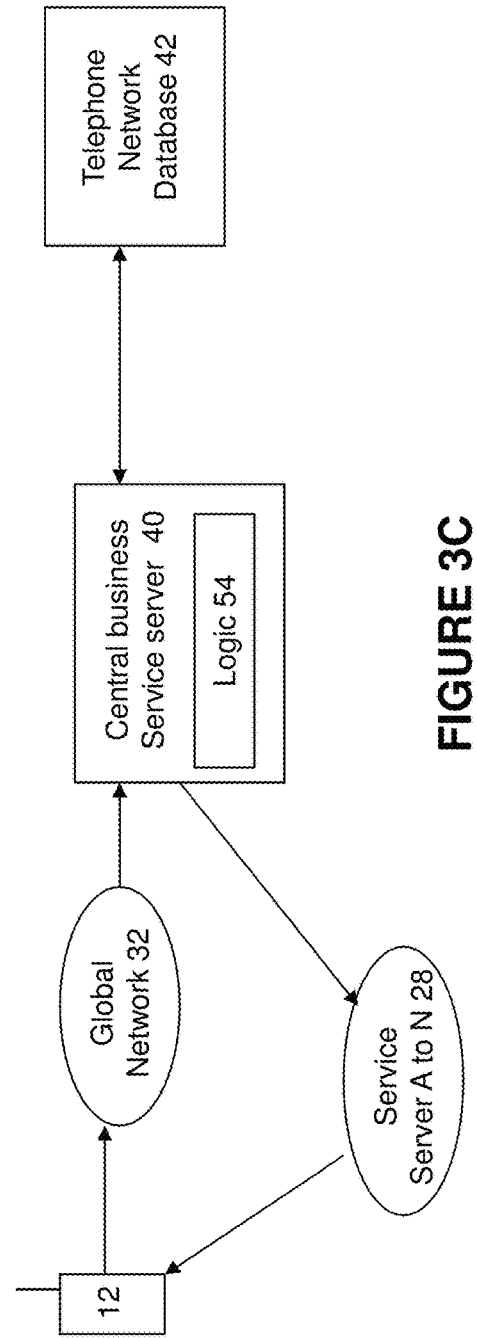

The operational mode is illustrated with reference to FIG. 3B.

At step 1 central service server 40 receives request from device 12.

At step 2, the service server 40 filters on sending IP address.

At step 3, determines if the request is from a mobile wireless device.

At step 4, if yes, sends a query with the device caller id to a global telephone network database to retrieve the location of the device 12.

At step 5, receives the location of the device 12.

At step 6, finds the nearest service server IP address.

At step 7, the server 40 and its logic 54 forwards or directs the device's request to that IP address.

As a simplified illustration, of the utility of the embodiment 10C, if a device 12 user makes a service connection to www.bankofamerica.com, the WB16 would send the request to be routed into the global network to central Bank of America server. The Bank of America server would use logic to detect that the request is from a wireless device and pick up the caller id and then send a query to the global telephone network database 42, to retrieve the current location 66 of the device 12. The main service server then would forward the href request packet to the IP address of the server closest to the device location. That specific server would respond to the request directly to the device 12.

As illustrated with reference to FIG. 5C, a method for a business server has the steps where all the steps may not be used or used in the order specified:

At step 128, receiving by the business server a request for service on a global network;

At step 130, filtering the request and determining those requests that are from a wireless mobile device associated with a caller id from a cellular telephone network;

At step 132, parsing the caller id and the network identification from the request for service's return address;

At step 134, sending a query with the device caller id to a global telephone network database to retrieve the cell location of the device and receiving the location of the device.

At step 136, using the cell identification, finding the nearest service server and its IP address.

At step 138, forwarding the service request to the IP address.

The embodiment 10C would let the device 12 be serviced by the local service server thus assuring a faster download of digital content to the device 12.

In summary, three alternative embodiments herein are described that enable faster access and download of digital content to mobile wireless devices from the service servers of the businesses in the global network. The service server may provide different types of services that may include short bursts of high priority traffic or download of large amounts of data such as for video and music. The service server may include any type of server such as web, mail, message, ftp etc.

Of these three embodiments 10A, 10B and 10C each has its own business and implementation issues that would decide how the technology is implemented in the marketplace. Embodiment 10B may offer the most seamless implementation if the wireless carriers chose to implement it, as it would be in their interest to improve the user experience of the their wireless device users using their wireless network. Alternatively, embodiment 10A may also be implemented in the marketplace by either the wireless carriers them selves or an independent business. Embodiment 10C is implemented independently of the wireless device and the wireless carrier and may appeal to large service organizations. Hence each implementation has its own pros and cons.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A network server on a global computer network, comprising:
   a CPU, a memory, and a network server logic stored in the memory and operating in the CPU, wherein the network server logic is configured to and maintains accounts for businesses who maintain business servers that store digital content for distribution to their mobile wireless device customers;
   wherein the network server serves a specific business purpose for, and is for use by, a plurality businesses, wherein the network server stores and maintains data specifically related to businesses' geographically distributed data servers, and wherein the geographically distributed data servers serve businesses' wireless mobile device customers by minimizing physical distance between business's wireless mobile device clients and the geographically distributed data servers;
   the network server has a CPU, a memory, and a network server logic stored in the memory and operating in the CPU, wherein the network server logic is configured to and maintains accounts for businesses who maintain business servers that store digital content for distribution to their mobile wireless device customers;
   a database with data fields that include at least domain names of businesses, and for each domain name, a list of mirror-imaged servers of the business along with their IP addresses, and for each mirror-imaged server its geographic location including a service area;
   the network server logic has an inbound data interface logic, wherein the inbound data interface logic is configured to receive updates to the database from businesses that have an account with the network server and updates the database for changes in the configuration of the business servers;
   the inbound data interface logic also being configured to receive a service request query from a wireless mobile device, the service request query including a domain name of a business and a geographic location of the wireless mobile device, wherein the service request query is used by the network server to determine, by accessing the database, a mirror-imaged data server corresponding to the domain name in the query that is nearest to the wireless mobile device;
   the network server logic also has an outbound data interface function that sends to the wireless mobile device an IP address of the mirror-imaged data server that is nearest to the wireless mobile device.

2. The network server, as in claim 1, comprising:
   the server logic has an authentication logic, wherein the authentication logic establishes an account and authenticates the businesses for the purpose of storing and updating their data related to service areas and business servers in the service areas by their IP addresses.

3. The network server as in claim 1, comprising:
   the database including a security database, wherein the security database stores in the security database, security data of mobile devices with data fields of at least mobile device identifications and their security associations.

4. The network server as in claim 3, comprising:
   the service request query received from the wireless mobile device, includes a security association of the mobile device and the security association is verified by the security database.

5. A method for a network server on a global computer network, the method comprising the steps of:
   providing the network server that serves a specific business purpose for, and is for use by, a plurality businesses, wherein the network server stores and maintains data specifically related to businesses' geographically distributed data servers, and wherein the geographically distributed data servers serve businesses' wireless mobile device customers by minimizing physical distance between business's wireless mobile device clients and the geographically distributed data servers;
   providing by the network server a CPU, a memory, and a network server logic stored in the memory and operating in the CPU, wherein the network server logic is configured to and maintains accounts for businesses who maintain business servers that store digital content for distribution to their mobile wireless device customers;
   providing the network server with a database with data fields that include at least domain names of businesses, and for each domain name, a list of mirror-imaged servers of the business along with their IP addresses, and for each mirror-imaged server its geographic location including a service area;
   providing the network server logic with an inbound data interface logic, wherein the inbound data interface logic receives updates to the database from businesses that have an account with the network server and updates the database server for changes in the configuration of the business servers;

the inbound data interface logic also receives a service request query from a wireless mobile device, the service request query including a domain name of a business and a geographic location of the wireless mobile device, wherein the service request query is used by the network server to determine, by accessing the database, a mirror-imaged data server corresponding to the domain name in the query that is nearest to the wireless mobile device;

the network server logic also has an outbound data interface function that sends to the wireless mobile device an IP address of the mirror-imaged data server that is nearest to the wireless mobile device.

6. The method for the network server, as in claim 5, comprising the steps of:

providing the server logic with an authentication logic for establishing an account and authenticating the businesses for the purpose of storing and updating their data related to service areas and business servers in the service areas by their IP addresses.

7. The method for the network server as in claim 5, comprising the steps of:

providing by the database with a security database, wherein the security database stores in the security database, security data of mobile devices with data fields of at least of mobile device identifications and their security associations.

8. The method for the network server as in claim 7, comprising the steps of:

receiving in the service request query from a wireless mobile device, a security association of the wireless mobile device and verifying the security association by the security database.

\* \* \* \* \*

UNITED STATES PATENT AND TRADEMARK OFFICE
CERTIFICATE OF CORRECTION

| | | |
|---|---|---|
| PATENT NO. | : 12,052,215 B2 | Page 1 of 1 |
| APPLICATION NO. | : 14/637253 | |
| DATED | : July 30, 2024 | |
| INVENTOR(S) | : Singhal | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1301 days.

Signed and Sealed this
Twenty-ninth Day of April, 2025

Coke Morgan Stewart
*Acting Director of the United States Patent and Trademark Office*